United States Patent
Patenaude et al.

(10) Patent No.: US 8,188,837 B2
(45) Date of Patent: May 29, 2012

(54) METHOD OF FINDING A KEY TO A MOBILE VEHICLE

(75) Inventors: Russell A. Patenaude, Macomb Township, MI (US); Steven C. Tengler, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 916 days.

(21) Appl. No.: 12/189,114

(22) Filed: Aug. 8, 2008

(65) Prior Publication Data

US 2010/0033342 A1 Feb. 11, 2010

(51) Int. Cl.
*G05B 19/00* (2006.01)
*G05B 23/00* (2006.01)
*G06F 7/00* (2006.01)
*G06F 7/04* (2006.01)
*G06K 19/00* (2006.01)
*G08B 5/00* (2006.01)
*G08B 13/00* (2006.01)
*G08B 19/00* (2006.01)
*G08B 21/00* (2006.01)
*G08B 23/00* (2006.01)
*G08B 25/00* (2006.01)
*G08B 29/00* (2006.01)
*G08B 1/08* (2006.01)
*G08C 19/00* (2006.01)
*H04B 1/00* (2006.01)
*H04B 3/00* (2006.01)
*H04L 9/14* (2006.01)
*H04L 9/32* (2006.01)
*H04Q 1/00* (2006.01)
*H04Q 9/00* (2006.01)

(52) U.S. Cl. ............. 340/5.33; 340/5.61; 340/539.32

(58) Field of Classification Search .............. 340/5.72, 340/539.32, 8.1, 5.33, 825.49
See application file for complete search history.

(56) References Cited

U.S. PATENT DOCUMENTS

| | | | | |
|---|---|---|---|---|
| 4,908,629 A | * | 3/1990 | Apsell et al. | 342/457 |
| 5,479,157 A | * | 12/1995 | Suman et al. | 340/5.28 |
| 5,864,297 A | | 1/1999 | Sollestre et al. | |
| 5,955,965 A | * | 9/1999 | Calandruccio | 340/8.1 |
| 6,166,652 A | * | 12/2000 | Benvenuti | 340/539.32 |
| 6,297,737 B1 | * | 10/2001 | Irvin | 340/571 |
| 7,119,686 B2 | * | 10/2006 | Bertness et al. | 340/572.1 |
| 2003/0206102 A1 | * | 11/2003 | Joao | 340/539.1 |

(Continued)

OTHER PUBLICATIONS

Anonymous, Adding a radio frequency-based locator feature to automotive key FOB, May 2002, Kenneth Mason Publications Ltd., Research disclosure# 457109.*

(Continued)

*Primary Examiner* — Daniel Wu
*Assistant Examiner* — Kam Ma
(74) *Attorney, Agent, or Firm* — Dierker & Associates, P.C.

(57) ABSTRACT

A method of finding a key to a mobile vehicle includes receiving a call, at a call center, indicating that the key is lost and requesting, via the call center, a telematics unit on-board the mobile vehicle to establish communication with a remote access key fob that is associated with the key, the remote access key fob having an alarm integrated therewith. The method further includes requesting, via the call center, the telematics unit to activate the alarm of the remote access key fob and activating, via the telematics unit, the alarm of the remote access key fob.

8 Claims, 4 Drawing Sheets

U.S. PATENT DOCUMENTS

| | | | |
|---|---|---|---|
| 2005/0099275 A1* | 5/2005 | Kamdar et al. | 340/426.18 |
| 2006/0028339 A1* | 2/2006 | Ogino et al. | 340/539.32 |
| 2006/0173587 A1 | 8/2006 | Oesterling et al. | |
| 2006/0279401 A1* | 12/2006 | Yoshii et al. | 340/5.61 |
| 2007/0075849 A1* | 4/2007 | Pitt | 340/426.2 |
| 2007/0120644 A1* | 5/2007 | Seike | 340/5.61 |
| 2007/0247281 A1* | 10/2007 | Shimomura | 340/5.72 |
| 2008/0157919 A1* | 7/2008 | Sugiura et al. | 340/5.61 |

OTHER PUBLICATIONS

U.S. Appl. No. 12/173,725, filed Jul. 15, 2008, Biondo et al.

* cited by examiner

METHOD OF FINDING A KEY TO A MOBILE VEHICLE

TECHNICAL FIELD

The present disclosure relates generally to a method of finding a key to a mobile vehicle.

BACKGROUND

Current mobile vehicles are often equipped with remote access technology, which enables a user of the vehicle to remotely access various vehicle components and/or systems. Examples of such vehicle components and/or systems include, but are not limited to, door locks, ignition start, climate control adjustment, and/or the like. The remote access technology is typically incorporated in a remote device, such as, e.g., a key fob, that is configured to wirelessly communicate with the vehicle system(s). In many instances, the key fob is carried by the user.

SUMMARY

A method of finding a key to a mobile vehicle includes receiving a call, at a call center, indicating that the key is lost, and requesting, via the call center, a telematics unit on-board the mobile vehicle to establish communication with a remote access key fob that is associated with the key, the remote access key fob having an alarm integrated therewith. The method further includes requesting, via the call center, the telematics unit to activate the alarm of the remote access key fob, and activating, via the telematics unit, the alarm of the remote access key fob.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method, as disclosed herein, advantageously enable a user of a mobile vehicle to find or otherwise locate his/her key to the mobile vehicle in the event that the key is lost or otherwise misplaced. The key to the mobile vehicle is associated with a key fob, typically accompanying the key on, e.g., a key ring or chain. The user may find the key by activating, via a telematics unit onboard the mobile vehicle, an alarm integrated with the key fob upon notification that the key is lost or misplaced. This alarm produces an audible and/or visual signal for the user, allowing the user to determine the location of the key. In some examples, the key fob may advantageously include a locating device associated therewith, whereby upon notification that the key is lost, the key fob may transmit its location to the on-board telematics unit, which is forwarded to a call center. The user may then retrieve the location of the key from the call center.

Some examples of the method further include deactivating one or more functions of the key fob upon notification that the key is lost. This advantageously prevents unauthorized third persons, who happen to find the key fob (accompanied with the key), from accessing and/or actuating the function(s) of the key fob. This substantially reduces the risk of possible vandalism of, damage to, and/or theft of the mobile vehicle.

It is to be understood that, as used herein, the term "user" includes vehicle owners, operators, passengers, authorized non-owners, and/or other persons associated with a particular mobile vehicle. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Figure 1:
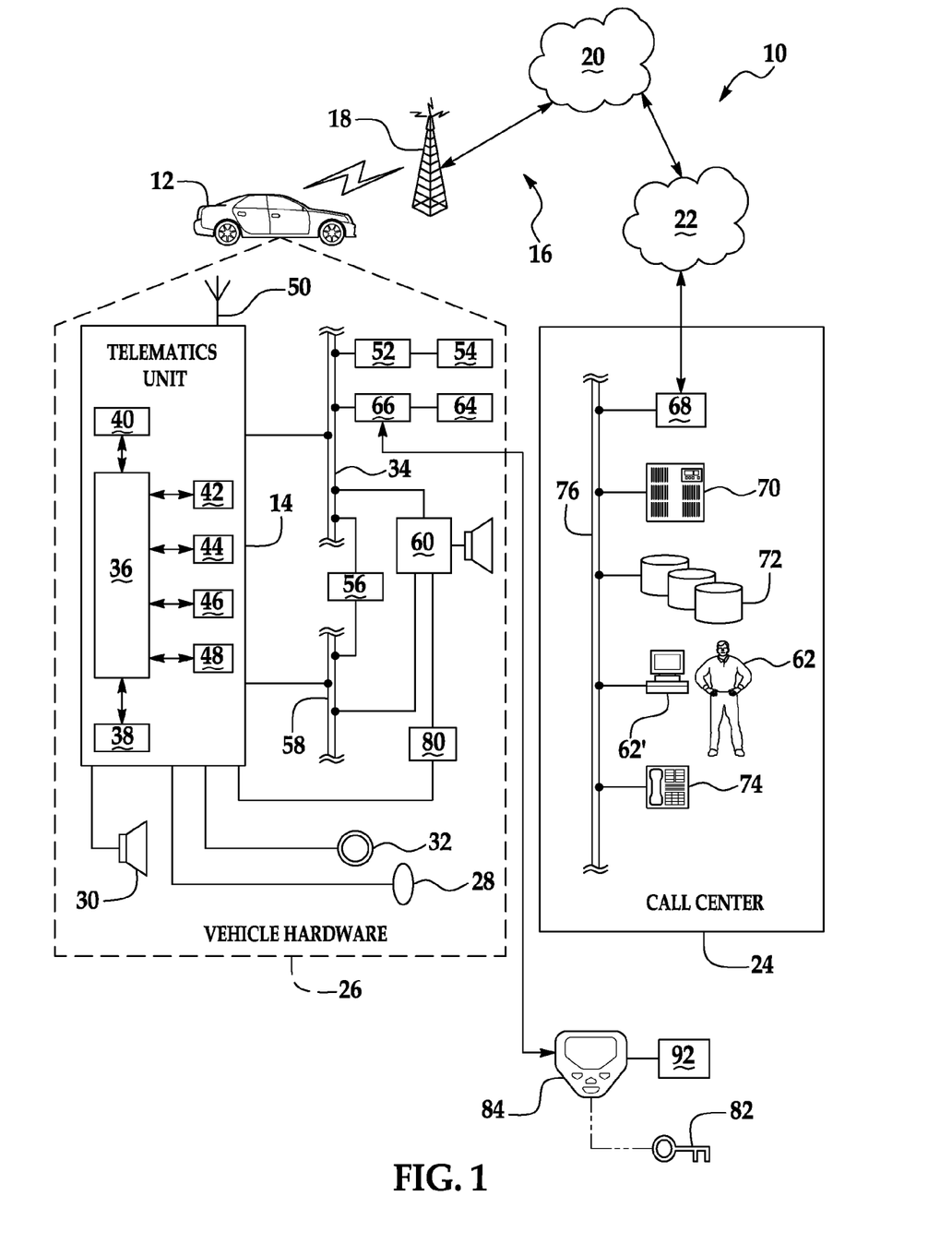
FIG. 1 is a schematic diagram depicting an example of a system for finding a key to a mobile vehicle using the method disclosed herein.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, one or more land networks 22, one or more service providers (not shown)), and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a Bluetooth® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The processor 36 is in operative communication with the vehicle bus 34. The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Furthermore, the telematics unit 14 and the vehicle bus 34 together perform various functions and/or tasks, which in some instances, are requested by the call center 24. In some instances, the telematics unit 14 sends one or more commands, requests, and/or actions over the vehicle bus 34 to, for example, a body control module (generally shown as a module interface 66 in FIG. 1), which relays the command(s), request(s), and/or action(s) to a remote access key fob 84 associated with a key 82 of the mobile vehicle 12 (described in further detail below). In an example, the telematics unit 14, via the body control module 66 or a dedicated short range communication system, may activate and/or deactivate one or more functions of the remote access key fob 84, request a then-current location of the key fob 84, and/or the like. Transmission of the commands, requests, and/or actions from the telematics unit 14 and ultimately to the key fob 84 may be accomplished via, e.g., a transmitter (not shown) operatively connected to the vehicle 12 and a receiver (also not shown) operatively connected to the key fob 84. It is to be understood that transmission of information to and/or from the telematics unit 14 and the key fob 84 (via the transmitter/receiver) is accomplished over relatively low ranges, e.g., a range of about 100 feet or less. In some instances, however, the transmission range may be larger, such as, e.g., up to about 300 feet.

Again, the above-listed services are by no means an exhaustive list of all the capabilities of telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

The call center 24 is also configured to receive a call from the user of the mobile vehicle 12 indicating that the user has lost his/her key 82 to the vehicle 12. The call center 24 is also configured to receive a call from, e.g., the user or a third person indicating that the key 82 has been found. Such information may be communicated to, e.g., the live or automated advisor 62, 62' located at the call center 24. The advisor 62, 62' may also verify, using verification information stored in at least one of the databases 72, that the caller is an authorized user associated with the mobile vehicle 12.

Switch 68, which may be a private branch exchange (PBX) switch, routes incoming signals so that voice transmissions are usually sent to either the live advisor 62 or an automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

It is to be understood that, although a service provider (not shown) may be located at the call center 24, the call center 24 is a separate and distinct entity from the service provider. In an example, the service provider is located remote from the call center 24. A service provider provides the user with telephone and/or Internet services. The service provider is generally a wireless carrier (such as, for example, Verizon Wireless®, AT&T®, Sprint®, etc.). It is to be understood that the service provider may interact with the call center 24 to provide service(s) to the user.

Still referring to FIG. 1, various components and/or systems of the mobile vehicle 12 may be accessed and/or actuated by a user of the vehicle 12 using the key 82 and/or the remote access key fob 84, which is associated with the key 82. In an example shown in FIG. 1, the remote access key fob 84 is a remote device separate from the key 82. In another example, which is not depicted in the figures, the remote access key fob 84 is integrated with the key 82 or is programmed to function as a wireless key for the vehicle 12.

As indicated above, the remote access key fob 84 is configured to wirelessly communicate with the telematics unit 14 of the mobile vehicle 12 via a wireless communication system. A non-limiting example of such a key fob 84 is disclosed in U.S. patent application Ser. No. 12/173,725, filed Jul. 15, 2008, the contents of which are incorporated herein by reference in its entirety. The key fob 84 may be programmed to recognize one of the module interfaces 66, and visa versa. In a non-limiting example, via the vehicle bus 34, the telematics unit 14 communicates with the body control module (represented as the module interface 66 in FIG. 1), which relays the communication to the key fob 84. In another non-limiting example, it is believed that the key fob 84 and the module 66 may be configured with a dedicated short range communication (DSRC) or other short range communication capability. In this latter non-limiting example, the module 66 may not be a body control module, and the DSRC may actually be embedded in the module 66, which is then capable of transmitting signals to the fob 84. The connection allows the telematics unit 14 to send notifications, commands, requests, and/or actions to the key fob 84 through the module 66. The connection further allows the key fob 84 to send information (e.g., a location of the key fob 84) back to the telematics unit 14 through the module 66.

Figure 2:
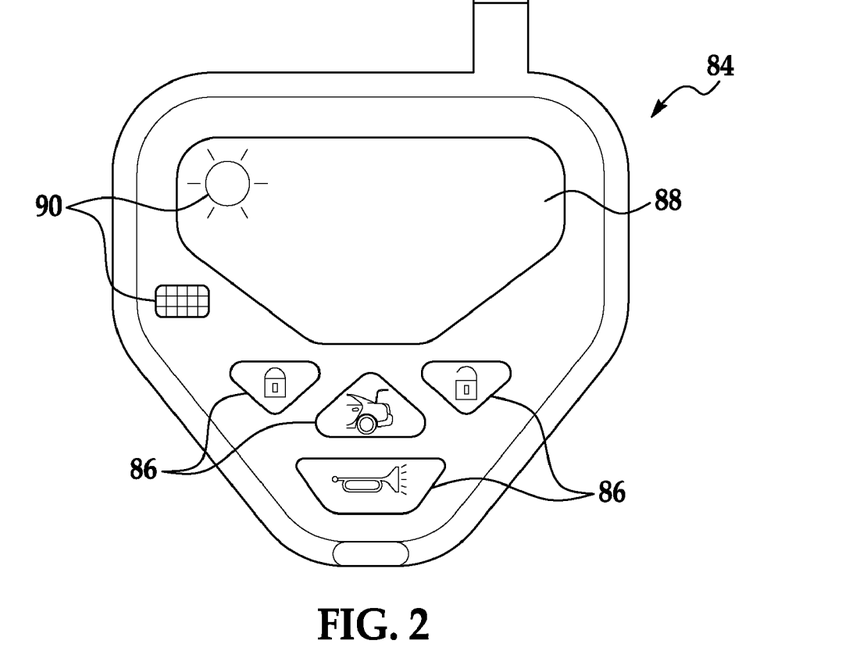
FIG. 2 is a semi-schematic depiction of an example of a remote access key fob associated with the key of the mobile vehicle.

Many configurations of the key fob 84 may be used in examples of the method disclosed herein, a non-limiting illustration of which is depicted in FIG. 2. The key fob 84 may be configured with one or more buttons 86 configured to allow the user (via pressing one or more of the buttons 86) to actuate and/or access one or more components and/or systems of the mobile vehicle 12. For example, four buttons 86 are shown on the key fob 84 in FIG. 2; one button 86 configured to actuate a door unlock function, one button 86 configured to actuate a door lock function, one button 86 configured to actuate a trunk opening function, and one button 86 configured to sound a panic alarm. The key fob 84, in some instances, may also be configured to turn on the ignition of the vehicle 12.

The key fob 84 may include a display screen 88, such as an LCD display, to present information to the user regarding the status of one or more components and/or systems of the vehicle 12. The display screen 88 may include verbal and/or graphical indicia representing, e.g., the currently actuated function. For example, a graphical depiction of the vehicle 12 may be shown on the display having the trunk in an open position if the trunk opening function is actuated using the key fob 84. Information pertaining to the status of the vehicle 12 may also be displayed on the display screen 88. This information includes, but is not limited to, whether the driver's side or passenger-side doors are locked or unlocked, whether the engine is running, security status checks on the vehicle 12, a current odometer reading of the vehicle 12, an amount of fuel remaining in the fuel tank, a current tire pressure of all four tires, radio pre-sets, and/or the like, and/or combinations thereof.

The key fob 84 further includes an alarm 90 integrated therewith. In an example, the alarm 90 is an audible alarm such as, e.g., a beep, an audible message, a substantially continuous sound, or the like. In another example, the alarm 90 is a visual alarm such as, e.g., a blinking light, a verbal and/or graphical message (e.g., textural information, such as "start inhibit activated" populated via the telematics unit 14) displayed on the display screen 88, or the like.

With reference again to FIG. 1, the key fob 84 may further include or otherwise be associated with a locating device 92 (e.g., a GPS). The locating device 92 may be used to determine the then-current location of the key fob 84 upon request by, e.g., the telematics unit 14.

Figure 3:
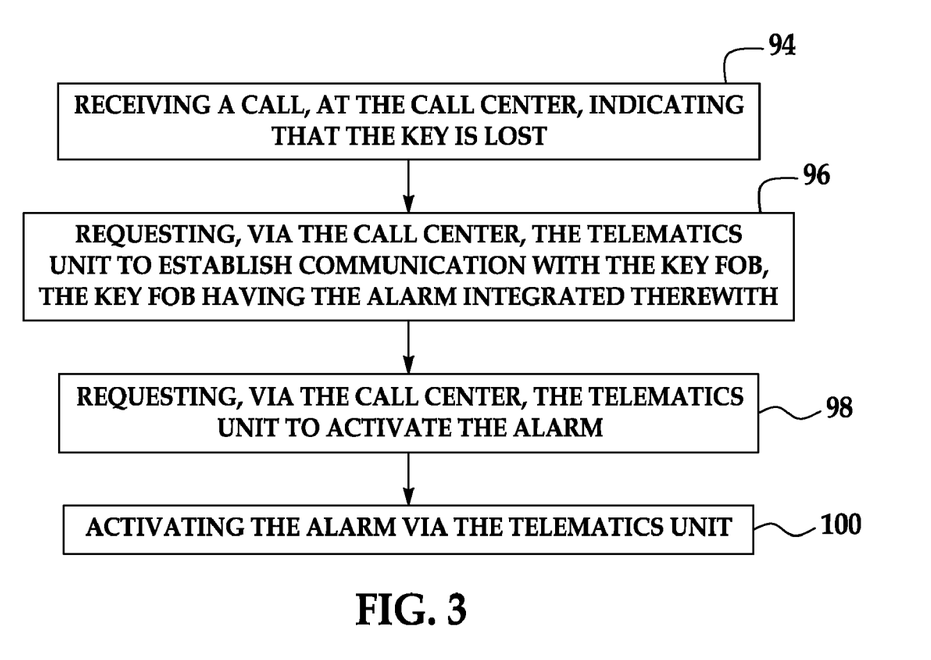
FIG. 3 is a flow diagram depicting an example of the method of finding the key to the mobile vehicle.

An example of the method of finding the key 82 to the mobile vehicle 12 is depicted in FIG. 3. The method begins by receiving a call, at the call center 24, indicating that the key 82 is lost (as shown at reference numeral 94). For example, in the event that the user of the vehicle 12 has lost or misplaced his/her key 82, he/she may call the call center 24. At the call center 24, the switch 68 directs the caller to the live 62 or automated 62' advisor, to whom the user indicates that his/her key 82 is lost.

When the call center 24 receives the user's call that the key 82 is lost, the call center 24 requests the telematics unit 14 (via a data transmission) on-board the mobile vehicle 12 to establish communication with the remote access key fob 84 that is associated with the key 82 (as shown by reference numeral 96). The call center 24 further requests the telematics unit 14 to activate the alarm 90 of the key fob 84 (as shown by reference numeral 98). In response thereto, the telematics unit 14 activates the alarm 90 (as shown by reference numeral 100). When the alarm 90 is activated, the key fob 84 produces one or more audible or visual signals. Such signals draw attention to the key fob 84, and may be useful to one or more persons looking for the key 82. In an example, the alarm 90 is activated for a predetermined time period, after which the alarm automatically deactivates. The length of the predetermined time period may be determined based on the internal battery used by the key fob 84 and/or the type of drain of the alarm 90 selected for the key fob 84. In an example, the alarm 90 may be activated for a time period ranging from about 30 seconds to about 2 minutes.

In an example, the telematics unit 14 may also send a request to the key fob 84 for its then-current location determined from the locating device 92 associated with the key fob 84. The telematics unit 14 may then forward the location information (retrieved from, e.g., the location detection chipset/component 44 such as a GPS) to the call center 24, where it may be retrieved by the user. Whether the user contacts the call center 24 requesting such information, or the call center 24 contacts the user with such information, the call center 24 may require user verification (e.g., user identification, a password associated with the user's account, etc.) prior to relaying the key fob 84 location information. In another example, the key fob 84 may automatically send its then-current GPS location to the telematics unit 14 upon activating the alarm 90.

In another example, the call center 24 may send a request to the telematics unit 14 to notify the key fob 84 that the key fob 84 is lost. In this example, the locating device 92 may be used to determine the then-current location of the key fob 84 and 1) a distance and 2) a direction between the vehicle 12 and the key fob 84 may be calculated from the location information. This calculation may be accomplished using, e.g., a processor internal to the key fob 84 or the telematics unit 14. In one instance, the key fob 84 transmits its location to the telematics unit 14, which determines the distance and direction; and in another instance, the key fob 84 queries the telematics unit 14 for its location, and upon receiving such information, determines the distance and direction. A signal indicating whether or not the key fob 84 is within the range, the distance to the key fob 84 from the vehicle 12, and the direction that the key fob 84 is located relative to the vehicle 12 is sent to the call center 24 through the telematics unit 14.

Figure 4:
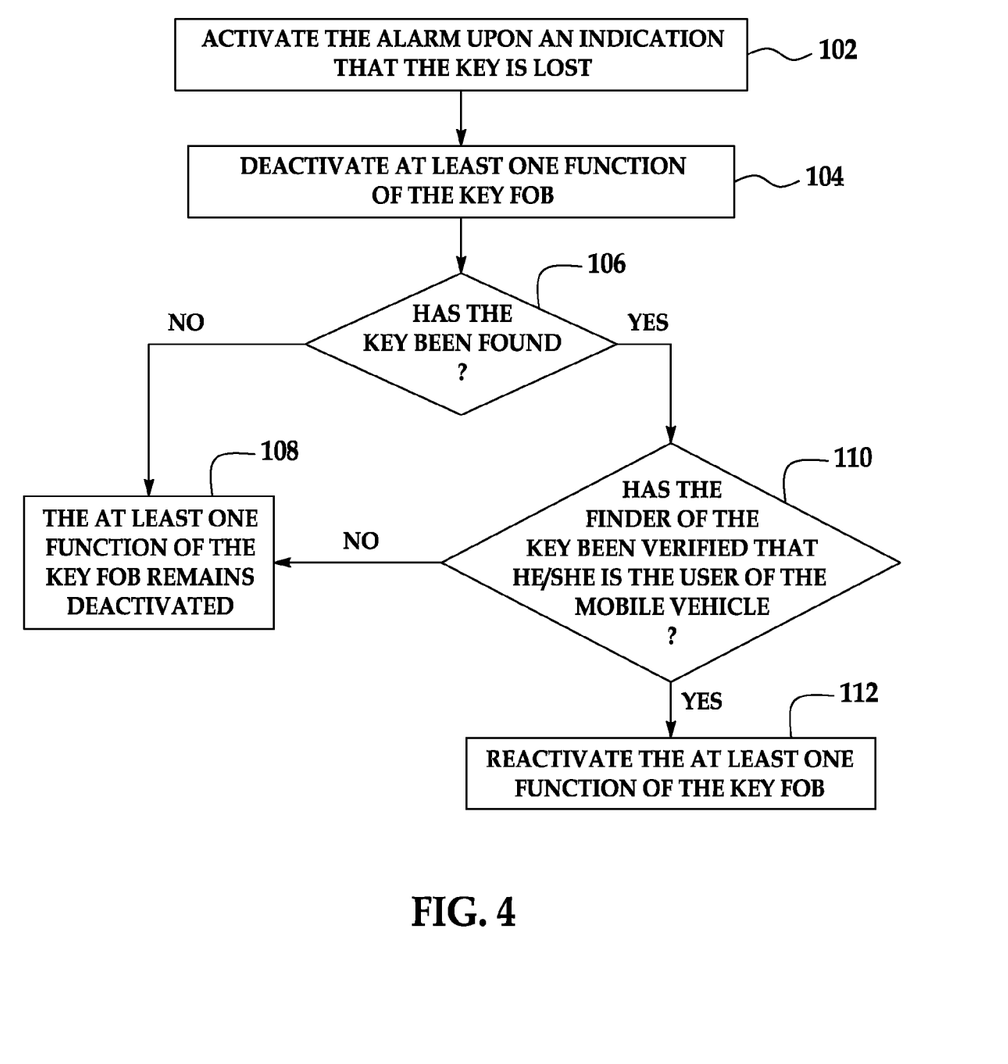
FIG. 4 is a flow diagram depicting another example of the method of finding the key to the mobile vehicle.

With reference now to FIG. 4, after the alarm 90 has been activated by the telematics unit 14 (as shown by reference numeral 102), an example of the method further includes deactivating at least one function of the key fob 84 (as shown by reference numeral 104). Non-limiting examples of functions of the key fob 84 that may be deactivated include a mobile vehicle door-unlocking function, a mobile vehicle ignition-start function, or a combination thereof. It is to be understood that deactivation of these functions may substantially prevent unauthorized third persons from accessing and/or actuating various components and/or systems of the mobile vehicle 12 in the event that a third person finds the user's key 82. For example, by deactivating the door-unlocking function, the finder (i.e., the user or the third person who found the key 82) will not be able to 1) determine the location of the vehicle 12, and 2) open any of the doors of the user's vehicle, including the trunk. Deactivating one or more key fob 84 functions prevents the key fob 84 from being used to locate the vehicle 12 and/or obtain access to the vehicle 12.

After one or more of the functions of the key fob 84 have been deactivated, the method also includes determining whether or not the key 82 has been found (as shown by reference numeral 106). So long as the key 82 has not been found by anyone (or at least has not been reported to the telematics unit 14 or call center 24 as having been found), the function(s) of the key fob 84 remain deactivated (as shown by reference numeral 108). In one example, if the key 82 has been found, the finder will confirm to the call center 24 that the key has been found in order to have the previously deactivated function(s) of the key fob 84 reactivated. Upon placing the call to the call center 24, the switch 68 will direct the finder to the advisor 62, 62', to whom the finder will notify that at least the key fob 84 associated with the key 82 has been found.

It is to be understood that, prior to reactivating the deactivated function(s) of the key fob 84, the advisor 62, 62' will verify that the finder is in fact a user associated with the mobile vehicle 12. Verification may be accomplished in several ways. For example, the finder may provide the advisor 62, 62' with a personal identification number (PIN) or name accompanied with a previously selected password. In another example, the finder may be asked one or more questions such as, e.g., "What is the model of your first car?", "What is your mother's maiden name?", or the like. Accurate information (e.g., PIN and password) and/or a correct response to the question(s) will verify the finder as an authorized user associated with the vehicle. It is to be understood that the authorized user may not be the vehicle owner, but is someone whom the owner has included in his/her profile as an authorized user.

In instances where the finder is not the owner of the vehicle 12 and has not been verified by the methods described above, the finder may otherwise be verified by calling or contacting, via the call center 24, the owner of the vehicle 12 and informing the owner that the non-owner has found the key 82. The call center 24 may provide one or more pieces of information which may assist in identifying the finder/non-owner to the owner of the vehicle 12. The owner may then 1) verify that he/she is associated with the non-owner based on the received information, and request the call center 24 to initiate a request to the telematics unit 14 to reactivate the deactivated function(s) of the key fob 84, or 2) verify that he/she is not associated with the non-owner, and ask that the call center 24 request that the non-owner provide the key 82 to the authorities, the call center 24, or some other location associated with the call center 24 (e.g., the dealership from which the user purchased the vehicle 12). In the later instance, the deactivated function(s) the key fob 84 remain deactivated, at least until the key fob 84 is returned.

In an example, the owner of the vehicle 12 may provide, to the call center 24, a list of authorized users of the vehicle 12. This list may be stored in at least one of the databases 72 located at the call center 24 (e.g., in the owner's profile). The list may include, e.g., the names, addresses, phone numbers, and/or personal and/or identifying information of one or more persons that are authorized to use the vehicle 12. The information stored in the database(s) 72 may be used by the advisor 62, 62' to verify one or more persons on the list in the event that one of the listed persons finds the key 82 and calls the call center 24 indicating the same.

Once the finder has been verified as an authorized user of the vehicle 12, the call center 24 and the owner are reassured that the key 82 is no longer lost. In response, the call center 24 initiates a request to the telematics unit 14 to reactivate the previously deactivated function(s) of the key fob 84. In some instances, the functions are reactivated upon confirmation that the key 82 is found. In other instances, the functions are reactivated when the owner confirms to the call center 24 that he/she is in possession of the key 82. Otherwise, the previously deactivated function(s) of the key fob 84 remain deactivated.

Figure 5:
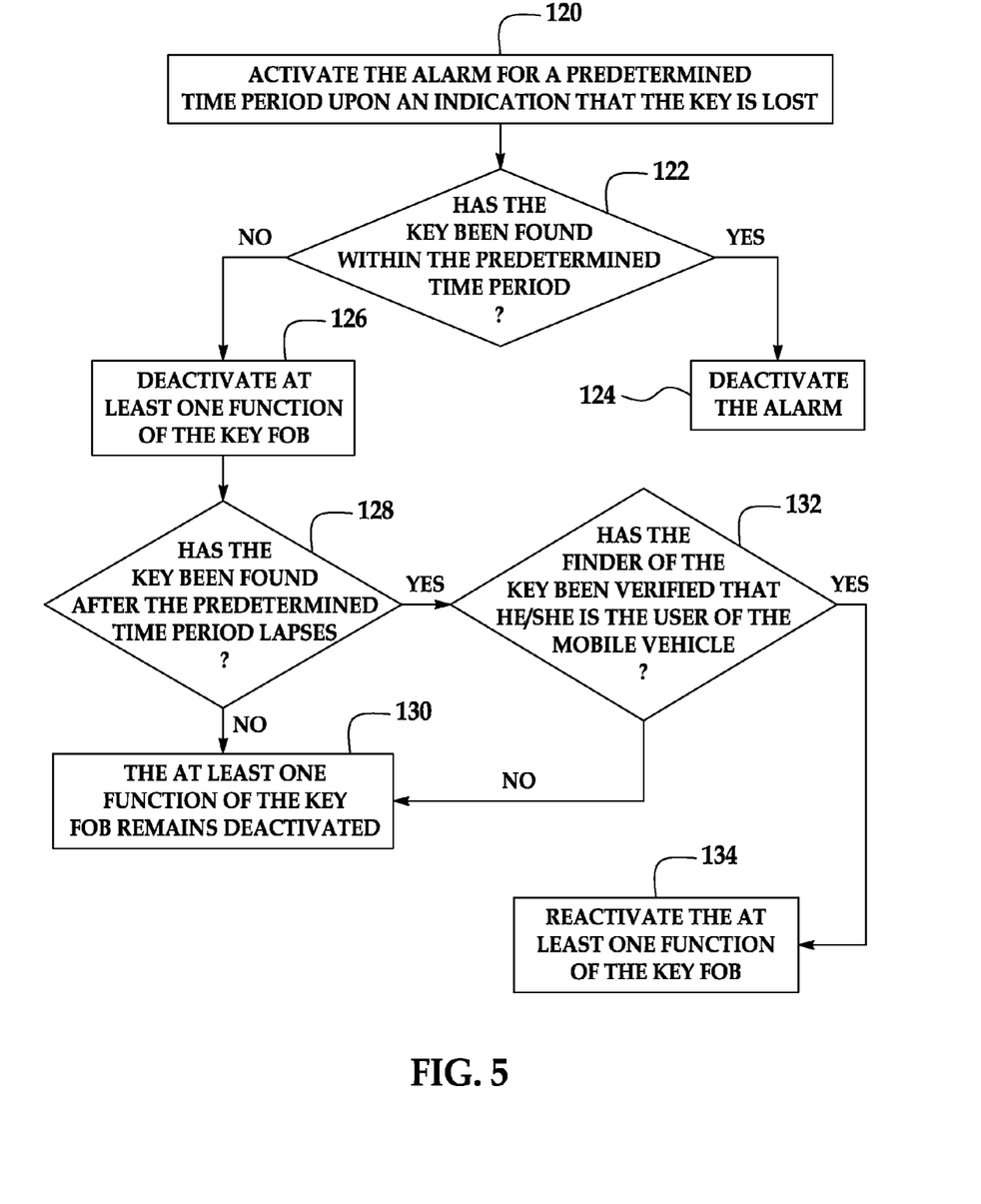
FIG. 5 is a flow diagram depicting yet a further example of the method of finding the key to the mobile vehicle.

In another example, as shown in FIG. 5, upon receiving an indication that the key 82 is lost, the call center 24 requests the telematics unit 14 to activate the alarm 90 for a predetermined time period (as shown by reference numeral 120). The predetermined time period may be set initially by the manufacturer. It is to be understood that the owner or other authorized user may alter the predetermined time period. For example, the user or authorized user may contact the call center 24, request that the predetermined time period be altered, and submit a new, desired time period. An inquiry is then made as to whether the key 82 has been found within the predetermined amount of time (as shown by reference numeral 122). Such an inquiry is generally made by the call center 24 contacting the vehicle owner and asking if they have found the key 82.

If, for example, the key 82 has been found within the predetermined amount of time, the alarm 90 is deactivated (as shown by reference numeral 124). Generally, the alarm 90 is deactivated by the person who finds the key fob 84. The deactivation triggers the key fob 84 to transmit a signal to the telematics unit 14 indicating that the alarm 90 has been deactivated. In response, the telematics unit 14 sends a data transmission to the call center 24, informing the call center 24 of the deactivation. The call center 24 may then contact the owner or other authorized vehicle user to confirm that he/she has the key fob 84 and/or key 82 in his/her possession. It is to be understood that the owner or authorized user should inform and confirm to the call center 24 that he/she has the key fob 84 and key 82 and/or the key fob 84 and key 82 has in fact been found, the call center 24 can then request the telematics unit 14 to reactivate any previously deactivated key fob 84 functions. If however, the vehicle owner or user does not have the key fob 84, the call center 24 can request the telematics unit 14 to deactivate one or more previously active key fob 84 functions.

If the key 82 is not found before the predetermined time period lapses, at least one function of the key fob 84 is deactivated until a user associated with the vehicle 12 confirms that the key 82 has been found (as shown by reference numeral 126).

Another inquiry is then made as to whether the key 82 has been found after the predetermined time period lapses (as shown by reference numeral 128). If the key 82 has 1) not been found, or 2) has been found by an unauthorized user, the deactivated function(s) of the key fob 84 remain deactivated (as shown by reference numerals 130 and 132). If, however, the key 82 has been found by an authorized user of the vehicle 12, the call center 24 initiates a request to the telematics unit 14 to reactive the deactivated function(s) of the key fob 84 (as shown by reference numeral 134).

While several examples have been described in detail, it will be apparent to those skilled in the art that the disclosed embodiments may be modified. Therefore, the foregoing description is to be considered exemplary rather than limiting.

The invention claimed is:

1. A method of finding a key of a mobile vehicle, the method comprising:
   receiving a call, at a call center, indicating that the key is lost;
   requesting, via the call center, a telematics unit on-board the mobile vehicle to establish communication with a remote access key fob that is associated with the key, the remote access key fob having an alarm integrated therewith;
   requesting, via the call center, the telematics unit to activate the alarm of the remote access key fob;
   activating, via the telematics unit, the alarm of the remote access key fob;
   deactivating at least one function of the remote access key fob, the at least one function being selected from a mobile vehicle door-unlocking function, a mobile vehicle ignition-start function, or combinations thereof;
   receiving confirmation from a user associated with the mobile vehicle that the key has been found;
   reactivating the previously deactivated at least one function of the remote access key fob in response to receiving confirmation;
   initiating, by a finder of the key, a call with an advisor of the call center;
   indicating to the advisor that the key has been found; and
   verifying that the finder is in fact the user associated with the mobile vehicle;
   wherein the user associated with the mobile vehicle is a non-owner of the mobile vehicle, and wherein the method further comprises contacting an owner of the mobile vehicle to inform the owner that the non-owner found the key.

2. The method as defined in claim 1 wherein the communication established between the telematics unit and the remote access key fob is wireless.

3. The method as defined in claim 1 wherein the alarm is at least one of a visual alarm or an audible alarm.

4. The method as defined in claim 1 wherein the key fob includes a locating device, and wherein the method further comprises sending a signal, from the key fob to the telematics unit, indicating a then-current location of the key fob.

5. The method as defined in claim 1 wherein the alarm is activated for a predetermined time period.

6. The method as defined in claim 5, further comprising:
   determining whether the key has been found within the predetermined time period; and
   if the key has not been found within the predetermined time period, deactivating the at least one function of the remote access key fob.

7. The method as defined in claim 1, further comprising:
   notifying the key fob that the key is lost;
   determining whether the key fob is within a predetermined range of the mobile vehicle; and
   notifying the telematics unit that the key fob is either within the range or not within the range.

8. The method as defined in claim 7 wherein if the key fob is not within the range, the method further comprises reactivating, via the telematics unit, the alarm of the key fob.

* * * * *